US012770146B2

(12) United States Patent
Putnam

(10) Patent No.: US 12,770,146 B2
(45) Date of Patent: Oct. 20, 2026

(54) DATA VERIFIED DEPOSITS

(71) Applicant: Plaid Inc., San Francisco, CA (US)

(72) Inventor: Warren Lowell Putnam, New York, NY (US)

(73) Assignee: Plaid Inc., San Francisco, CA (US)

( * ) Notice: Subject to any disclaimer, the term of this patent is extended or adjusted under 35 U.S.C. 154(b) by 0 days.

(21) Appl. No.: 18/147,433

(22) Filed: Dec. 28, 2022

(65) Prior Publication Data

US 2023/0137660 A1 May 4, 2023

Related U.S. Application Data

(63) Continuation of application No. 17/103,267, filed on Nov. 24, 2020, now Pat. No. 11,580,544, which is a continuation of application No. 16/042,618, filed on Jul. 23, 2018, now Pat. No. 10,878,421.

(60) Provisional application No. 62/535,860, filed on Jul. 22, 2017.

(51) Int. Cl.

| | |
|---|---|
| ***G06Q 20/40*** | (2012.01) |
| ***G06Q 20/02*** | (2012.01) |
| ***G06Q 20/10*** | (2012.01) |
| ***G06Q 20/38*** | (2012.01) |
| ***G06Q 20/42*** | (2012.01) |

(52) U.S. Cl.
CPC ....... *G06Q 20/4014* (2013.01); *G06Q 20/023* (2013.01); *G06Q 20/108* (2013.01); *G06Q 20/3821* (2013.01); *G06Q 20/42* (2013.01)

(58) Field of Classification Search
CPC ............. G06Q 20/4014; G06Q 20/023; G06Q 20/108; G06Q 20/3821; G06Q 20/42
See application file for complete search history.

(56) References Cited

U.S. PATENT DOCUMENTS

| | | | |
|---|---|---|---|
| 5,063,507 | A | 11/1991 | Lindsey et al. |
| 5,237,499 | A | 8/1993 | Garback |
| 5,347,632 | A | 9/1994 | Filepp et al. |
| 5,634,127 | A | 5/1997 | Cloud et al. |
| 5,649,186 | A | 7/1997 | Ferguson |
| 5,701,451 | A | 12/1997 | Rogers et al. |
| 5,710,884 | A | 1/1998 | Dedrick |

(Continued)

FOREIGN PATENT DOCUMENTS

| | | |
|---|---|---|
| EP | 0848336 A1 | 6/1998 |
| EP | 0848338 A1 | 6/1998 |

(Continued)

OTHER PUBLICATIONS

PR Newswire., "Boeing Chooses NetMind Enterprise Minder to Help Thousands of Employees Track Web-Based Information," Nov. 1998.

(Continued)

*Primary Examiner* — Patrick Mcatee
*Assistant Examiner* — Vincent I Idiake
(74) *Attorney, Agent, or Firm* — Harrity & Harrity, LLP

(57) ABSTRACT

A system and method for verifying account ownership using verified deposits. An ACH verification platform may recognize or detect a verification process involving micro deposits. A verification platform may receive and store user login, initiate the deposits, and monitor the user's account to verify that posting of the deposits was successful. In embodiments, a dedicated web form or portal may be provided for receiving verification information.

20 Claims, 3 Drawing Sheets

(56) References Cited

U.S. PATENT DOCUMENTS

| | | | |
|---|---|---|---|
| 5,710,918 | A | 1/1998 | Lagarde et al. |
| 5,721,908 | A | 2/1998 | Lagarde et al. |
| 5,727,159 | A | 3/1998 | Kikinis |
| 5,745,754 | A | 4/1998 | Lagarde et al. |
| 5,752,246 | A | 5/1998 | Rogers et al. |
| 5,778,065 | A | 7/1998 | Hauser et al. |
| 5,778,367 | A | 7/1998 | Wesinger, Jr. et al. |
| 5,787,403 | A | 7/1998 | Randle |
| 5,793,964 | A | 8/1998 | Rogers et al. |
| 5,813,007 | A | 9/1998 | Nielsen |
| 5,815,665 | A | 9/1998 | Teper et al. |
| 5,819,284 | A | 10/1998 | Farber et al. |
| 5,835,724 | A | 11/1998 | Smith |
| 5,838,910 | A | 11/1998 | Domenikos et al. |
| 5,838,916 | A | 11/1998 | Domenikos et al. |
| 5,845,073 | A | 12/1998 | Carlin et al. |
| 5,855,018 | A | 12/1998 | Chor et al. |
| 5,862,325 | A | 1/1999 | Reed et al. |
| 5,870,559 | A | 2/1999 | Leshem et al. |
| 5,875,296 | A | 2/1999 | Shi et al. |
| 5,878,219 | A | 3/1999 | Vance, Jr. et al. |
| 5,892,905 | A | 4/1999 | Brandt et al. |
| 5,892,909 | A | 4/1999 | Grasso et al. |
| 5,898,836 | A | 4/1999 | Freivald et al. |
| 5,901,287 | A | 5/1999 | Bull et al. |
| 5,903,881 | A | 5/1999 | Schrader et al. |
| 5,908,469 | A | 6/1999 | Botz et al. |
| 5,913,214 | A | 6/1999 | Madnick et al. |
| 5,918,216 | A | 6/1999 | Miksovsky et al. |
| 5,920,848 | A | 7/1999 | Schutzer et al. |
| 5,926,798 | A | 7/1999 | Carter |
| 5,930,764 | A | 7/1999 | Melchione et al. |
| 5,930,777 | A | 7/1999 | Barber |
| 5,933,604 | A | 8/1999 | Inakoshi |
| 5,933,816 | A | 8/1999 | Zeanah et al. |
| 5,956,720 | A | 9/1999 | Fernandez et al. |
| 5,961,593 | A | 10/1999 | Gabber et al. |
| 5,961,601 | A | 10/1999 | Iyengar |
| 5,963,915 | A | 10/1999 | Kirsch |
| 5,963,925 | A | 10/1999 | Kolling et al. |
| 5,966,967 | A | 10/1999 | Agrawal et al. |
| 5,978,828 | A | 11/1999 | Greer et al. |
| 5,978,842 | A | 11/1999 | Noble et al. |
| 5,983,267 | A | 11/1999 | Shklar et al. |
| 5,983,268 | A | 11/1999 | Freivald et al. |
| 5,987,440 | A | 11/1999 | O'Neil et al. |
| 5,987,454 | A | 11/1999 | Hobbs |
| 5,995,943 | A | 11/1999 | Bull et al. |
| 5,999,971 | A | 12/1999 | Buckland |
| 6,003,032 | A | 12/1999 | Bunney et al. |
| 6,006,333 | A | 12/1999 | Nielsen |
| 6,023,698 | A | 2/2000 | Lavey, Jr. et al. |
| 6,041,362 | A | 3/2000 | Mears et al. |
| 6,047,327 | A | 4/2000 | Tso et al. |
| 6,055,570 | A | 4/2000 | Nielsen |
| 6,078,929 | A | 6/2000 | Rao |
| 6,082,776 | A | 7/2000 | Feinberg |
| 6,092,196 | A | 7/2000 | Reiche |
| 6,092,197 | A | 7/2000 | Coueignoux |
| 6,105,131 | A | 8/2000 | Carroll |
| 6,119,101 | A | 9/2000 | Peckover |
| 6,138,158 | A | 10/2000 | Boyle et al. |
| 6,148,337 | A | 11/2000 | Estberg et al. |
| 6,151,581 | A | 11/2000 | Kraftson et al. |
| 6,151,601 | A | 11/2000 | Papierniak et al. |
| 6,182,142 | B1 | 1/2001 | Win et al. |
| 6,185,567 | B1 | 2/2001 | Ratnaraj et al. |
| 6,195,698 | B1 | 2/2001 | Lillibridge et al. |
| 6,199,077 | B1 | 3/2001 | Inala et al. |
| 6,205,433 | B1 | 3/2001 | Boesch et al. |
| 6,208,975 | B1 | 3/2001 | Bull et al. |
| 6,209,007 | B1 | 3/2001 | Kelley et al. |
| 6,243,816 | B1 | 6/2001 | Fang et al. |
| 6,246,999 | B1 | 6/2001 | Riley et al. |
| 6,278,449 | B1 | 8/2001 | Sugiarto et al. |
| 6,278,999 | B1 | 8/2001 | Knapp |
| 6,292,789 | B1 | 9/2001 | Schutzer |
| 6,297,819 | B1 | 10/2001 | Furst |
| 6,301,584 | B1 | 10/2001 | Ranger |
| 6,308,203 | B1 | 10/2001 | Itabashi et al. |
| 6,311,275 | B1 | 10/2001 | Jin et al. |
| 6,317,783 | B1 | 11/2001 | Freishtat et al. |
| 6,360,205 | B1 | 3/2002 | Iyengar et al. |
| 6,366,933 | B1 | 4/2002 | Ball et al. |
| 6,401,118 | B1 | 6/2002 | Thomas |
| 6,405,245 | B1 | 6/2002 | Burson et al. |
| 6,412,073 | B1 | 6/2002 | Rangan |
| 6,424,968 | B1 | 7/2002 | Broster et al. |
| 6,430,539 | B1 | 8/2002 | Lazarus et al. |
| 6,484,155 | B1 | 11/2002 | Kiss et al. |
| 6,499,042 | B1 | 12/2002 | Markus |
| 6,510,451 | B2 | 1/2003 | Wu et al. |
| 6,519,571 | B1 | 2/2003 | Guheen et al. |
| 6,567,411 | B2 | 5/2003 | Dahlen |
| 6,567,850 | B1 | 5/2003 | Freishtat et al. |
| 6,594,766 | B2 | 7/2003 | Rangan et al. |
| 6,631,402 | B1 | 10/2003 | Devine et al. |
| 6,632,248 | B1 | 10/2003 | Isaac et al. |
| 6,633,910 | B1 | 10/2003 | Rajan et al. |
| 6,725,200 | B1 | 4/2004 | Rost |
| 6,802,042 | B2 | 10/2004 | Rangan et al. |
| 6,859,931 | B1 | 2/2005 | Cheyer et al. |
| 6,957,199 | B1 | 10/2005 | Fisher |
| 7,028,049 | B1 | 4/2006 | Shelton |
| 7,072,932 | B1 | 7/2006 | Stahl |
| 7,092,913 | B2 | 8/2006 | Cannon, Jr. |
| 7,200,578 | B2 | 4/2007 | Paltenghe et al. |
| 7,263,548 | B2 | 8/2007 | Daswani et al. |
| 7,275,046 | B1 | 9/2007 | Tritt et al. |
| 7,340,411 | B2 | 3/2008 | Cook |
| 7,370,011 | B2 | 5/2008 | Bennett et al. |
| 7,424,520 | B2 | 9/2008 | Daswani et al. |
| 7,640,210 | B2 | 12/2009 | Bennett et al. |
| 7,752,535 | B2 | 7/2010 | Satyavolu |
| 8,006,291 | B2 | 8/2011 | Headley et al. |
| 8,010,783 | B1 | 8/2011 | Cahill |
| 8,086,508 | B2 | 12/2011 | Dheer et al. |
| 8,140,431 | B1 | 3/2012 | Murphy |
| 8,145,914 | B2 | 3/2012 | Steeves |
| 8,166,562 | B2 | 4/2012 | Holvey et al. |
| 8,209,194 | B1 | 6/2012 | Nidy et al. |
| 8,266,515 | B2 | 9/2012 | Satyavolu |
| 8,613,066 | B1 | 12/2013 | Brezinski et al. |
| 8,645,264 | B2 | 2/2014 | Allison et al. |
| 8,676,611 | B2 | 3/2014 | McLaughlin et al. |
| 8,739,260 | B1 | 5/2014 | Damm-Goossens |
| 8,788,416 | B1 | 7/2014 | Vu |
| 8,995,967 | B1 | 3/2015 | Billman |
| 9,106,642 | B1 | 8/2015 | Bhimanaik |
| 9,202,250 | B1 | 12/2015 | Palaniappan |
| 9,418,387 | B1 | 8/2016 | Aaron et al. |
| 9,430,892 | B2 | 8/2016 | Amdahl |
| 9,449,346 | B1 | 9/2016 | Hockey et al. |
| 9,595,023 | B1 | 3/2017 | Hockey et al. |
| 9,699,187 | B2 | 7/2017 | Chen et al. |
| 9,774,590 | B1 | 9/2017 | Bronshtein et al. |
| 9,906,520 | B2 | 2/2018 | Fouad et al. |
| 9,946,996 | B1 | 4/2018 | Bedell |
| 10,003,591 | B2 | 6/2018 | Hockey et al. |
| 10,104,059 | B2 | 10/2018 | Hockey et al. |
| 10,319,029 | B1 | 6/2019 | Hockey et al. |
| 10,339,608 | B1 | 7/2019 | Haitz et al. |
| 10,523,653 | B2 | 12/2019 | Hockey et al. |
| 10,530,761 | B2 | 1/2020 | Hockey et al. |
| 10,546,348 | B1 | 1/2020 | Lesner et al. |
| 10,614,463 | B1 | 4/2020 | Hockey et al. |
| 10,621,658 | B1 * | 4/2020 | Sahni .................. G06Q 50/265 |
| 10,679,303 | B1 | 6/2020 | Aaron et al. |
| 10,726,491 | B1 | 7/2020 | Hockey et al. |
| 10,762,559 | B2 | 9/2020 | Alejo et al. |
| 10,878,421 | B2 | 12/2020 | Putnam |
| 10,904,239 | B2 | 1/2021 | Hockey et al. |
| 10,984,468 | B1 | 4/2021 | Hockey et al. |
| 11,030,682 | B1 | 6/2021 | Hockey et al. |

(56) References Cited

U.S. PATENT DOCUMENTS 11,050,729 B2 6/2021 Hockey et al.
11,216,814 B1 1/2022 Hockey et al.
11,295,294 B1 4/2022 Kurani et al.
11,316,862 B1 4/2022 Pate et al.
11,327,960 B1 5/2022 Jin et al.
11,430,057 B1 8/2022 Hockey et al.
11,468,085 B2 10/2022 Putnam et al.
11,503,010 B2 11/2022 Hockey et al.
2001/0011274 A1 8/2001 Klug et al.
2002/0002596 A1 1/2002 Sugiarto et al.
2002/0065772 A1 5/2002 Saliba et al.
2002/0091635 A1* 7/2002 Dilip .................. G06Q 20/3821 705/39
2002/0095588 A1 7/2002 Shigematsu et al.
2003/0023879 A1 1/2003 Wray
2003/0028646 A1 2/2003 Wray
2003/0060896 A9 3/2003 Hulai et al.
2003/0158960 A1 8/2003 Engberg
2003/0163425 A1 8/2003 Cannon
2003/0182035 A1 9/2003 DiLodovico et al.
2003/0185370 A1 10/2003 Rosera et al.
2003/0204460 A1 10/2003 Robinson et al.
2004/0059672 A1 3/2004 Baig et al.
2005/0027617 A1 2/2005 Zucker et al.
2005/0154913 A1 7/2005 Barriga et al.
2005/0177510 A1 8/2005 Hilt et al.
2005/0222929 A1 10/2005 Steier et al.
2005/0246269 A1 11/2005 Smith
2006/0015358 A1 1/2006 Chua
2006/0116949 A1 6/2006 Wehunt et al.
2006/0136332 A1 6/2006 Ziegler
2006/0190569 A1 8/2006 Neil et al.
2006/0236384 A1 10/2006 Lindholm et al.
2007/0179883 A1 8/2007 Questembert
2007/0179942 A1 8/2007 Heggem
2007/0198432 A1 8/2007 Pitroda et al.
2007/0225047 A1 9/2007 Bakos
2007/0255662 A1 11/2007 Tumminaro
2007/0289002 A1 12/2007 Van Der Horst et al.
2008/0051059 A1 2/2008 Fisher
2008/0052192 A1 2/2008 Fisher
2008/0052233 A1 2/2008 Fisher et al.
2008/0120129 A1 5/2008 Seubert et al.
2008/0162361 A1 7/2008 Sklovsky et al.
2008/0183628 A1 7/2008 Oliver et al.
2008/0243784 A1 10/2008 Stading
2008/0249931 A1 10/2008 Gilder et al.
2008/0250246 A1 10/2008 Arditti et al.
2009/0037308 A1 2/2009 Feinstein
2009/0070257 A1 3/2009 Csoka
2009/0157555 A1 6/2009 Biffle et al.
2009/0222900 A1 9/2009 Benaloh et al.
2009/0228779 A1 9/2009 Williamson et al.
2009/0245521 A1 10/2009 Vembu et al.
2009/0271847 A1 10/2009 Karjala et al.
2009/0328177 A1 12/2009 Frey et al.
2010/0027552 A1 2/2010 Hill
2010/0043054 A1 2/2010 Kidwell
2010/0049850 A1 2/2010 Nanduri et al.
2010/0169072 A1 7/2010 Zaki et al.
2010/0185868 A1 7/2010 Grecia
2010/0223160 A1 9/2010 Brown
2010/0235882 A1 9/2010 Moore
2010/0313255 A1 12/2010 Khuda
2010/0325710 A1 12/2010 Etchegoyen
2011/0055079 A1 3/2011 Meaney et al.
2011/0196790 A1 8/2011 Milne
2011/0238550 A1 9/2011 Reich et al.
2011/0247060 A1 10/2011 Whitmyer, Jr.
2011/0295731 A1 12/2011 Waldron, III et al.
2012/0059706 A1 3/2012 Goenka et al.
2012/0116880 A1 5/2012 Patel et al.
2012/0129503 A1 5/2012 Lindeman et al.
2012/0191603 A1 7/2012 Nuzzi
2012/0209775 A1 8/2012 Milne
2012/0215688 A1 8/2012 Musser et al.
2012/0233212 A1 9/2012 Newton et al.
2012/0246073 A1 9/2012 Gore et al.
2012/0253876 A1 10/2012 Hersch
2012/0278201 A1 11/2012 Milne
2012/0281058 A1 11/2012 Laney et al.
2012/0284175 A1 11/2012 Wilson et al.
2012/0323717 A1 12/2012 Kirsch
2013/0019297 A1 1/2013 Lawson et al.
2013/0041736 A1 2/2013 Coppinger
2013/0041739 A1 2/2013 Coppinger
2013/0041744 A1 2/2013 Coppinger
2013/0046599 A1 2/2013 Coppinger
2013/0097685 A1 4/2013 Kennedy et al.
2013/0125223 A1 5/2013 Sorotokin et al.
2013/0174015 A1 7/2013 Jeff
2013/0191526 A1 7/2013 Zhao
2013/0232006 A1 9/2013 Holcomb et al.
2013/0232159 A1 9/2013 Daya et al.
2013/0247005 A1 9/2013 Hirsch et al.
2013/0282577 A1 10/2013 Milne
2013/0318592 A1 11/2013 Grier, Sr. et al.
2014/0032414 A1 1/2014 Beisner et al.
2014/0040148 A1 2/2014 Ozvat et al.
2014/0044123 A1 2/2014 Lawson et al.
2014/0067499 A1 3/2014 Stepanovich
2014/0150072 A1 5/2014 Castro et al.
2014/0165156 A1 6/2014 Fushman et al.
2014/0173695 A1 6/2014 Valdivia
2014/0180962 A1 6/2014 Fiala et al.
2014/0189002 A1 7/2014 Orioli et al.
2014/0189808 A1 7/2014 Mahaffey et al.
2014/0189828 A1 7/2014 Baghdasaryan et al.
2014/0208389 A1 7/2014 Kelley
2014/0215551 A1 7/2014 Allain et al.
2014/0229462 A1 8/2014 Lo
2014/0236716 A1 8/2014 Shapiro et al.
2014/0245411 A1 8/2014 Meng et al.
2014/0258063 A1 9/2014 Chourasia et al.
2014/0280555 A1 9/2014 Tapia et al.
2014/0344141 A1 11/2014 Cook
2014/0358704 A1 12/2014 Banerjee et al.
2014/0365350 A1 12/2014 Shvarts
2015/0026024 A1 1/2015 Calman et al.
2015/0046338 A1 2/2015 Laxminarayanan et al.
2015/0052064 A1* 2/2015 Karpenko .......... G06Q 20/3227 705/71
2015/0066719 A1 3/2015 Agrawal et al.
2015/0066765 A1 3/2015 Banks et al.
2015/0088707 A1 3/2015 Drury et al.
2015/0088732 A1 3/2015 DeVan, Jr. et al.
2015/0113511 A1 4/2015 Poulin
2015/0161608 A1 6/2015 Gilbert et al.
2015/0193871 A1 7/2015 Murphy
2015/0254672 A1 9/2015 Huesch et al.
2015/0281225 A1 10/2015 Schoen et al.
2015/0310562 A1 10/2015 Chourasia et al.
2015/0332265 A1* 11/2015 Perry ..................... C08G 18/14 705/44
2015/0339664 A1 11/2015 Wong et al.
2015/0365399 A1 12/2015 Biswas et al.
2016/0063657 A1 3/2016 Chen et al.
2016/0098577 A1* 4/2016 Lacey ................. G06F 21/6263 726/28
2016/0203531 A1* 7/2016 Teshima .............. G06F 21/6218 705/34
2017/0118301 A1 4/2017 Kouru et al.
2017/0132633 A1 5/2017 Whitehouse
2017/0148021 A1 5/2017 Goldstein et al.
2017/0193112 A1 7/2017 Desineni et al.
2017/0193486 A1 7/2017 Parekh
2017/0200137 A1 7/2017 Mlmont
2017/0200234 A1 7/2017 Morse et al.
2017/0262840 A1 9/2017 Dunwoody
2017/0289901 A1* 10/2017 Kim ....................... G06Q 50/00
2017/0300960 A1 10/2017 Khvostov et al.
2017/0308902 A1 10/2017 Quiroga et al.
2018/0047025 A1* 2/2018 Anderson ............ G06Q 20/388
2018/0060927 A1 3/2018 Gupta

(56) References Cited

U.S. PATENT DOCUMENTS

| | | | | |
|---|---|---|---|---|
| 2018/0157851 | A1 | 6/2018 | Sgambati et al. | |
| 2018/0191685 | A1 | 7/2018 | Bajoria | |
| 2018/0196694 | A1 | 7/2018 | Banerjee et al. | |
| 2018/0232734 | A1 | 8/2018 | Smets et al. | |
| 2018/0246943 | A1 | 8/2018 | Avagyan et al. | |
| 2018/0267847 | A1 | 9/2018 | Smith et al. | |
| 2018/0267874 | A1 | 9/2018 | Keremane et al. | |
| 2018/0330342 | A1 | 11/2018 | Prakash et al. | |
| 2018/0349909 | A1 | 12/2018 | Allen et al. | |
| 2018/0367428 | A1 | 12/2018 | Di Pietro et al. | |
| 2019/0075115 | A1 | 3/2019 | Anderson et al. | |
| 2019/0180364 | A1 | 6/2019 | Chong et al. | |
| 2019/0333159 | A1 | 10/2019 | Chourasia et al. | |
| 2019/0354544 | A1 | 11/2019 | Hertz et al. | |
| 2020/0110585 | A1 | 4/2020 | Perry | |
| 2020/0234376 | A1 | 7/2020 | Lord et al. | |
| 2021/0004439 | A1 | 1/2021 | Xiong et al. | |
| 2021/0025995 | A1* | 1/2021 | Slobodyanyuk | G01S 17/931 |
| 2021/0165960 | A1 | 6/2021 | Eisenschlos et al. | |
| 2021/0217016 | A1 | 7/2021 | Putnam | |
| 2021/0233162 | A1 | 7/2021 | Hockey et al. | |
| 2021/0241256 | A1* | 8/2021 | Caldwell | G06Q 20/10 |
| 2021/0288956 | A1 | 9/2021 | Hockey et al. | |
| 2021/0297422 | A1* | 9/2021 | McDorman | H04L 63/107 |
| 2021/0336949 | A1* | 10/2021 | Kohli | H04L 63/18 |
| 2021/0350340 | A1 | 11/2021 | Lai et al. | |
| 2022/0067690 | A1* | 3/2022 | Nair | G06Q 20/40 |
| 2022/0217147 | A1 | 7/2022 | Pate et al. | |
| 2022/0229980 | A1 | 7/2022 | Jin et al. | |
| 2022/0253856 | A1* | 8/2022 | Wong | G06Q 20/4016 |
| 2022/0327141 | A1 | 10/2022 | Putnam et al. | |

FOREIGN PATENT DOCUMENTS

| | | | | |
|---|---|---|---|---|
| EP | 0848339 | A1 | 6/1998 | |
| EP | 2747374 | A1 | 6/2014 | |
| EP | 3347846 | A1 | 7/2018 | |
| EP | 3893142 | A1 * | 10/2021 | G06N 3/042 |
| WO | 9638795 | A1 | 12/1996 | |
| WO | 9709682 | A1 | 3/1997 | |
| WO | 9710542 | A1 | 3/1997 | |
| WO | 9726612 | A1 | 7/1997 | |
| WO | 9737314 | A1 | 10/1997 | |
| WO | 9814896 | A1 | 4/1998 | |
| WO | 0025227 | A1 | 5/2000 | |
| WO | 2017044479 | A1 | 3/2017 | |
| WO | 2017173021 | A1 | 10/2017 | |
| WO | 2022082186 | A1 | 4/2022 | |

OTHER PUBLICATIONS

PR Newswire., "NetMind Accepts $7 Million Strategic Investment From Three Prominent VC Firms—BancBoston, Softbank and Draper Fisher Jurvestson," Nov. 1998.

PR Newswire., "NetMind Updates the World's Largest Free Web Tracking Service," PR Newswire, Sep. 1998.

Quwaider M., et al., "Experimental Framework for Mobile Cloud Computing System," Jordan University of Science and Technology, Procedia Computer Science 52, 2015, pp. 1147-1152.

Sullivan E., "Caravelle's InfoWatcher 1.1 Keeps an Eye on the Web," PC Week 1997.

Sunwoo D., et al., "A Structured Approach to the Simulation, Analysis and Characterization of Smartphone Applications", IEEE 2013, pp. 113-122.

Supplementary European Search Report in EP Application No. 16844973.4, dated Jan. 4, 2019.

U.S. Appl. No. 14/719,110, System and Method for Programmatically Accessing Financial Data, filed May 21, 2015.

U.S. Appl. No. 14/719,117, System and Method for Facilitating Programmatic Verification of Transactions, filed May 21, 2015.

U.S. Appl. No. 17/302,630, System and Method for Programmatically Accessing Data, filed May 7, 2021.

U.S. Appl. No. 17/533,728, System and Method for Facilitating Programmatic Verification of Transactions, filed Nov. 23, 2021.

"Web Interface Definition Language (WIDL)", W3 Consortium submission from webMethods, Inc., Sep. 22, 1997.

Zhao Y., et al., "A Single Login Web Service Integrator—WebEntrance," Sixth International World Wide Web Conference, Apr. 1997, pp. 7-11.

Zhao Y., et al., "WebEntree: A Web Service Aggregator" IBM Systems Journal, 1998, vol. 37(4), pp. 584-595.

Adam B.M., et al., "Backend Server System Design Based on REST API for Cashless Payment System on Retail Community," International Electronics Symposium (IES), Sep. 2019, pp. 208-213.

Business Wire., "Cognisoft Announces IntelliServ, A Revolutionary Intranet Information Management Application; a Powerful Solution that Enables the Right Information to Find the Right User at the Right Time," Business Wire, 1996, p. 8140125.

Business Wire., "FirstFloor and AirMedia Announce Partnership," 1997.

Business Wire., "GC Tech's GlobeID Payment Internet Commerce Software Supports Microsoft, Merchant Server," Jan. 1997, p. 1211286.

Chard et al., "Efficient and Secure Transfer, Synchronization, and Sharing of Big Data", IEEE Cloud Computing, 2014, vol. 1(3), pp. 46-55.

Chaulagain R.S., et al., "Cloud Based Web Scraping for Big Data Application," IEEE International Conference on Smart Cloud, Nov. 2017, pp. 138-143.

Co-pending U.S. Appl. No. 17/815,024, filed Jul. 26, 2022.

Corena et al., "Secure and fast aggregation of financial data in cloud-based expense tracking applications." Journal of Network and Systems Management, 2012, vol. 20(4), 534-560.

Devlin J., et al., "BERT: Pre-training of Deep Bidirectional Transformers for Language Understanding," Proceedings of NAACL-HLT, Jun. 2-7, 2019, pp. 4171-4186.

Douglis "The AT&T Internet Difference Engine: Tracking and Viewing Changes on the Web," World Wide Web, Jan. 1998, vol. 1(1), pp. 27-44.

European Search Report in EP Application No. 21215799.4 dated Mar. 25, 2022, 8 pages.

Examination Report in AU Application No. 2016321166 dated Dec. 7, 2020, 5 pages.

Examination Report in CA Application No. 2997115, dated Apr. 2, 2020.

Examination Report in CA Application No. 2997115, dated Jun. 20, 2019.

Examination Report in CA Application No. 2997115, dated Nov. 13, 2019.

Examination Report in CA Application No. 2997115 dated Nov. 2, 2020, 3 pages.

Examination Report in CA Application No. 3119897 dated Jul. 30, 2021, 6 pages.

Examination Report in EP Application No. 16844973.4 dated Nov. 4, 2020, 6 pages.

Fujitsu ., "Fujitsu Announces 'WebAgent' Application as part of ByeDesk Link Wireless Server Software," Business Wire, Sep. 1998.

Fujitsu., "Fujitsu Announces Availability of ByeDesk Link for Alpha-Numeric Pagers; Next Step in Empowering Mobile Workforces with 'Anyplace, Anytime' Information," Business Wire, Jul. 1998.

Fujitsu., "Fujitsu's ByeDesk Link Now Available on the PalmPilot," Business Wire, Sep. 1998.

Fujitsu., "Fujitsu Picks NetMind for Wireless Web Agent Software," Computergram International, Sep. 1998.

Google Groups., "Automatic Notification of Web Sites Changes," Aug. 1995.

Google Groups., "Versatile Intelligent Agents in Commercial Applications," Dec. 1998.

Hagel J., et al., "The Coming Battle for Customer Information," Harvard Business Review, Jan.-Feb. 1997, reprint No. 97104.

Hummer W., et al., "Ws-Aggregation: Distributed of Web Services Data," Proceedings of the 2011 ACM Symposium on Applied Computing. ACM, 2011.

(56) References Cited

OTHER PUBLICATIONS

International Search Report and Written Opinion in PCT Application No. PCT/US2021/030808, mailed on Jun. 21, 2021, 11 pages.
International Search Report and Written Opinion in PCT Application No. PCT/US2021/071851, dated Dec. 13, 2021, 10 pages.
International Search Report in PCT Application No. PCT/US2016/050536, dated Dec. 15, 2016.
Jin C., "How Plaid Parses Transaction Data," Oct. 22, 2020, 10 pages, retrieved from the internet URL: https://plaid.com/blog/how-plaid-parsestransaction-data/.
Johner et al., "Sign on with IBM's Global Sign-On!" IBM manual, Nov. 1998. Part 1, in 184 pages.
Johner et al., "Sign on with IBM's Global Sign-On!" IBM manual, Nov. 1998. Part 2, pp. 166-307.
Kim Y.G. et. al., "A Design of User Authentication System Using QR code Identifying Method," 6th International Conference on Computer Sciences and Convergence Information Technology (ICCIT), pp. 31-35, 2011.
Knoblock C.A., et al., "A Hierarchical Approach to Wrapper Induction," In Proceedings of the 3rd International Conference on Autonomous Agents, May 1999.
Knoblock C.A., et al., "Building Agents for Internet-base Supply Chain Integration," In Proceedings of the Workshop on Agents for Electronic Commerce and Managing the Internet-Enabled Supply Chain, May 1999.
Knoblock C.A., et al., "Semi-automatic wrapper generation for Internet information sources," In Proceedings of the Second IFCIS International Conference on Cooperative Information Systems, Jun. 1997.
Knoblock C.A., et al., "Intelligent caching for information mediators: A kr based approach," In Proceedings of the Workshop on Knowledge Representation meets Databases (KRDB), May 1998.
Knoblock C.A., et al., "Modeling Web Sources for Information Integration," In Proceedings of the Fifteenth National Conference on Artificial Intelligence, 1998. Jul. 1998.
Knoblock C.A., et al., "Optimizing Information Agents by Selectively Materializing Data," In Proceedings of the AAAI'98 Workshop on AI and Information Integration, Jul. 1998.
Knoblock C.A., et al., "The Ariadne Approach to Web-based Information Integration," IEEE Intelligent Systems, Sep. 1998, 13(5).
Knoblock C.A., et al., "Wrapper generation for semi-structured Internet sources," In Proceedings of the Workshop on Management of Semistructured Data, May 1997.
Knoblock C.A., et al., "Wrapper induction for semistructured, web-based information sources," In Proceedings of the Conference on Automated Learning and Discovery Workshop on Learning from Text and the Web, Jun. 1998.
Kravitz D.W., "Highly Scalable On-Line Payments via Task Decoupling," Financial Cryptography First International Conference, 1998, p. 355-373.
Kyeongwon C., et al., 'A Mobile based Anti-Phishing Authentication Scheme using QR code', IEEE International Conference on Mobile IT Convergence, 2011, pp. 109-113.
Mancini E., et al., "Simulation in the Cloud Using Handheld Devices," Workshop on Modeling and Simulation on Grid and Cloud Computing, Apr. 2012, 8 pages.
Mcchesney M.C., et al., "Banking in Cyberspace: an Investment in Itself," IEEE Spectrum, Feb. 1997, vol. 34 (2), pp. 54-59.
"Minding Web Site Changes," PC Week, Sep. 1998.
Mohammed et al., "A Multi-layer of Multi Factors Authentication Model for Online Banking Services," International Conference on Computing, Electrical and Electronic Engineering (ICCEEE), 2013, pp. 220-224.
Neville S.W., et al., "Efficiently Archieving Full Three-Way Non-repudiation in Consumer-level eCommerce and M-Commerce Transactions," 2011 IEEE 10th International Conference on Trust, Security and Privacy in Computing and Communications, Nov. 2011, pp. 664-672.
O'Riain S., et al., "XBRL and open data for global financial ecosystems: A linked data approach," International Journal of Accounting Information Systems, 2013, vol. 13(2), pp. 141-162.

* cited by examiner

DATA VERIFIED DEPOSITS

INCORPORATION BY REFERENCE TO ANY PRIORITY APPLICATIONS

This application is a continuation of U.S. patent application Ser. No. 17/103,267, filed Nov. 24, 2020 and titled "DATA VERIFIED DEPOSITS," which is a continuation of U.S. patent application Ser. No. 16/042,618, filed Jul. 23, 2018 and titled "DATA VERIFIED DEPOSITS," and issued as U.S. patent Ser. No. 10/878,421, which claims priority to U.S. Provisional Patent Application No. 62/535,860, filed Jul. 22, 2017 and titled "DATA VALIDATED DEPOSITS." The contents of each of the aforementioned applications are incorporated herein in their entireties for all purposes. Any and all applications for which a foreign or domestic priority claim is identified in the Application Data Sheet as filed with the present application are hereby incorporated by reference under 37 CFR 1.57.

BACKGROUND

NACHA, previously known as the National Automated Clearinghouse Association, recommends that account ownership be verified prior to initiating ACH transfers to or from customer accounts. Trial deposits are widely viewed as the safest and most effective way to verify account ownership, but they provide a poor customer experience and have ongoing limitations.

Traditional trial deposit methods require a customer to submit their account number and routing number to a service provider. The service provider then makes one (or several) small "random" deposits into the customer's account based on the information provided. The customer then checks the amounts of the deposits made by the service provider when they are posted to their account, which typically takes one to two business days. The customer then verifies the amounts back to the service provider, proving that they have access to the account.

However, these trial deposits are often unattractive to consumers, who are required take multiple steps, i.e., initiating the trial deposit, verifying multiple times that the deposit has been made, and then verifying the deposit back to the merchant or financial institution. Multi-step verification can also reduce the success verification rate, which can lead to lost opportunities for service providers.

Accordingly, there is a need for an account verification system that reliably permits verification with a single user action, obviating the need for the user to return to the service provider to verify deposits.

There is a further need for an account verification system that enables verification of an account held by a financial institution that is unable or unwilling to provide account numbers through their client web portals.

BRIEF DESCRIPTION OF THE DRAWINGS

The features and advantages of the present disclosure will be more fully understood with reference to the following detailed description when taken in conjunction with the accompanying figures, wherein.

SUMMARY

In embodiments of the invention a method is described comprising the steps of associating a customer account to a third-party service provider; receiving, during associating of the customer account, at least one credential; retrieving, after associating of the customer account, account data for the customer account; initiating a trial deposit to the customer account; retrieving ongoing data about the customer account directly from the financial institution, including the current balance and transactions data; and verifying, upon identifying the trial deposit, the customer account.

In further embodiments of the invention, a non-transitory computer-readable medium is described, having stored thereon, computer-executable instructions that, if executed by a computing device, cause the computing device to perform a method comprising the steps of associating a customer account to a third-party service provider; receiving, during associating of the customer account, at least one account verification credential; retrieving, after associating of the customer account, account data for the customer account; initiating a trial deposit to the customer account; retrieving ongoing data about the customer account directly from the financial institution, including the current balance and transactions data; and verifying, upon identifying the trial deposit, the customer account.

In still further embodiments, a data verification deposit system is described comprising at least one user computing device comprising a processor, memory, and storage, configured to initiate associating a customer account to a third-party service provider, the customer account associated with a financial institution, The data verification system may further include a server computing device configured to receive at least one account verification credential and to retrieve, after associating of the customer account, account data for the customer account directly from the financial institution. In embodiments, the server computing device is further configured to initiate a trial deposit to the customer account, to retrieve ongoing data about the customer account directly from the financial institution, and to verify, upon identifying the trial deposit, the customer account.

In embodiments, the customer account is an account associated with a financial institution, and the account data is retrieved directly from the financial institution. In embodiments, at least one account verification credential includes the customer's account number and routing number or the customer's user ID and password.

In embodiments, the account data for the customer account includes the current balance or transaction data.

DETAILED DESCRIPTION

In embodiments of the invention, a system and method is provided for customer accounts to be verified with a single user action minimizing the need for the customer to return to the service provider to verify the deposit amounts.

Figure 1:
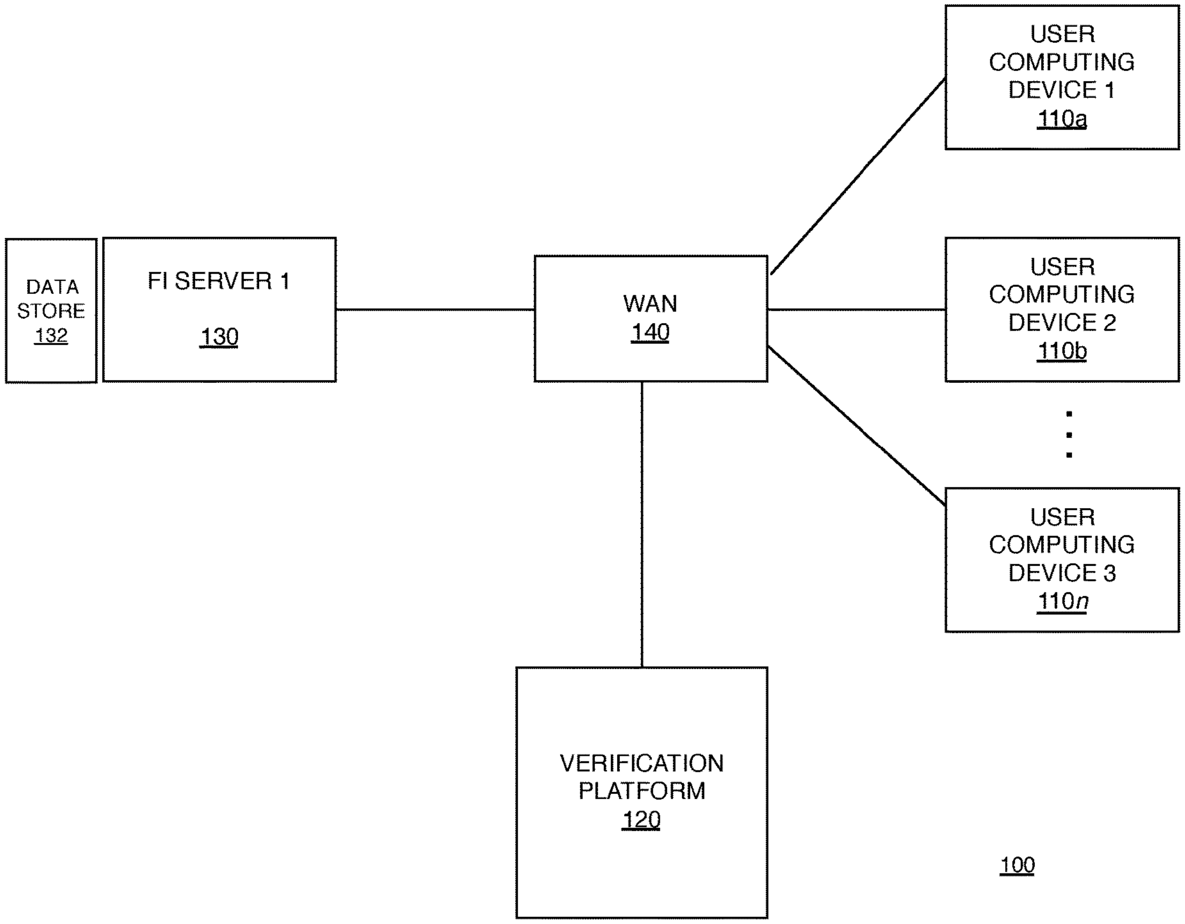
FIG. 1 is a logical block diagram describing a preferred embodiment of the present invention.

Referring to FIG. 1, a logical block diagram is shown describing a preferred embodiment of the present invention. One or more user computing devices 110*a* . . . 110*n* may be in communication with a verification platform 120 via a wide-area network such as the Internet. A financial institution web site 130 may be associated with a financial institution data store 132 via a network link such as a local area network 140. Financial institution website 130 may similarly be in communication with the verification platform 120 via a wide-area network such as the Internet.

In embodiments, verification platform 120 functions as a bridge or gateway between the user computing devices 110*a* . . . 110*n* and the financial institution web site 130 (and associated a financial institution data store 132) to facilitate account verification with minimized user involvement.

FIG. 1 illustrates just one example of a logical framework that may be used, and those of skill in the art will appreciate that the specific implementation is secondary to the functionality that the system components provide.

Process Flow

Figure 2:
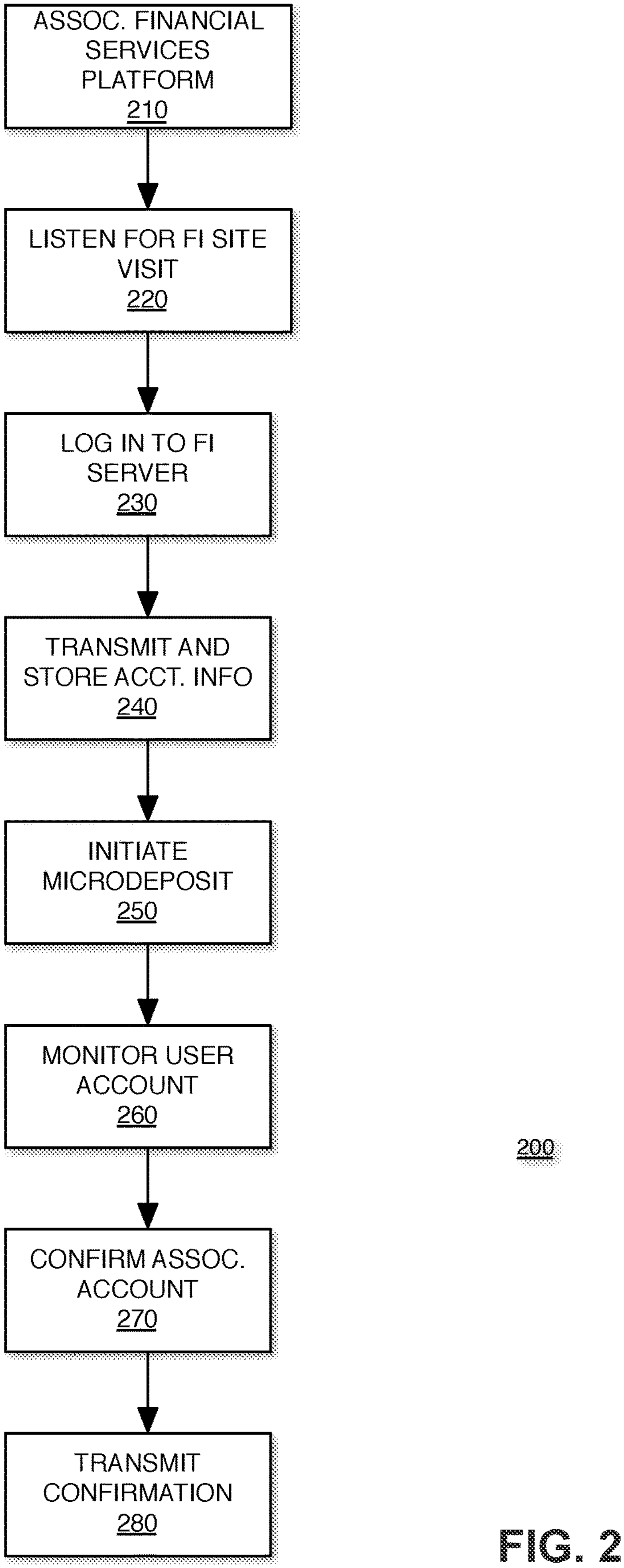
FIG. 2 is a process diagram describing the steps in an exemplary embodiment of the present invention.

Referring to FIG. 2, a process diagram is shown describing the steps in an exemplary embodiment of the present invention.

In a preferred embodiment, a user initiates (210) a process that requires verifying the user's external account so that the account is associated with the financial services platform. Certain financial services platforms (e.g., PayPal, Venmo, bank bill pay, loan payments, etc.) may permit ACH payments, deposits, or withdrawals to or from an external account, often only after the user verifies the external account. In embodiments, during the verification process the user may be requested to enter their login credentials for the financial services provider holding the account to be associated, along with the account number and routing number.

In embodiments, the user computing device or the verification platform may recognize or detect (220) a verification request that initiates the verification process of the present invention. In embodiments, the financial institution web site may use a specially configured form to initiate the verification process of the present invention. In still further embodiments a browser plugin, system service, web widget, or even a dedicated mobile app may trigger the verification process. In embodiments, an API may be provided to provide a connection between the financial services provider and the verification platform of the present invention.

A user may then log in (230) to the financial institution web site per usual, with the user's normal login credentials. The user's login credentials and/or banking information such as account and routing number may then be transmitted (240) to the verification platform for storage.

The verification platform may then take steps to verify the user's account using the saved login credentials. In embodiments, the verification platform may initiate a trial deposit (250) using the account and routing numbers gathered from the user.

The verification platform may then monitor the user's financial services account by logging in on a periodic basis and verifying (260) the user's transaction history. When the microdeposit made in the prior step is identified as cleared, the verification platform may then verify (270) the account.

The account verification may then be transmitted (280) to the user computing device or financial services provider.

In embodiments, account aggregation may also be used to limit user involvement in the verification process. For example, in some cases a financial institution may permit account and routing numbers to be retrieved upon authenticating user credentials via a financial institution's client web portal. However, for cases where user credentials provide access to financial institution data, but do not permit retrieval of account and routing number information, the verification method described herein may be utilized.

System Architecture

Figure 3:
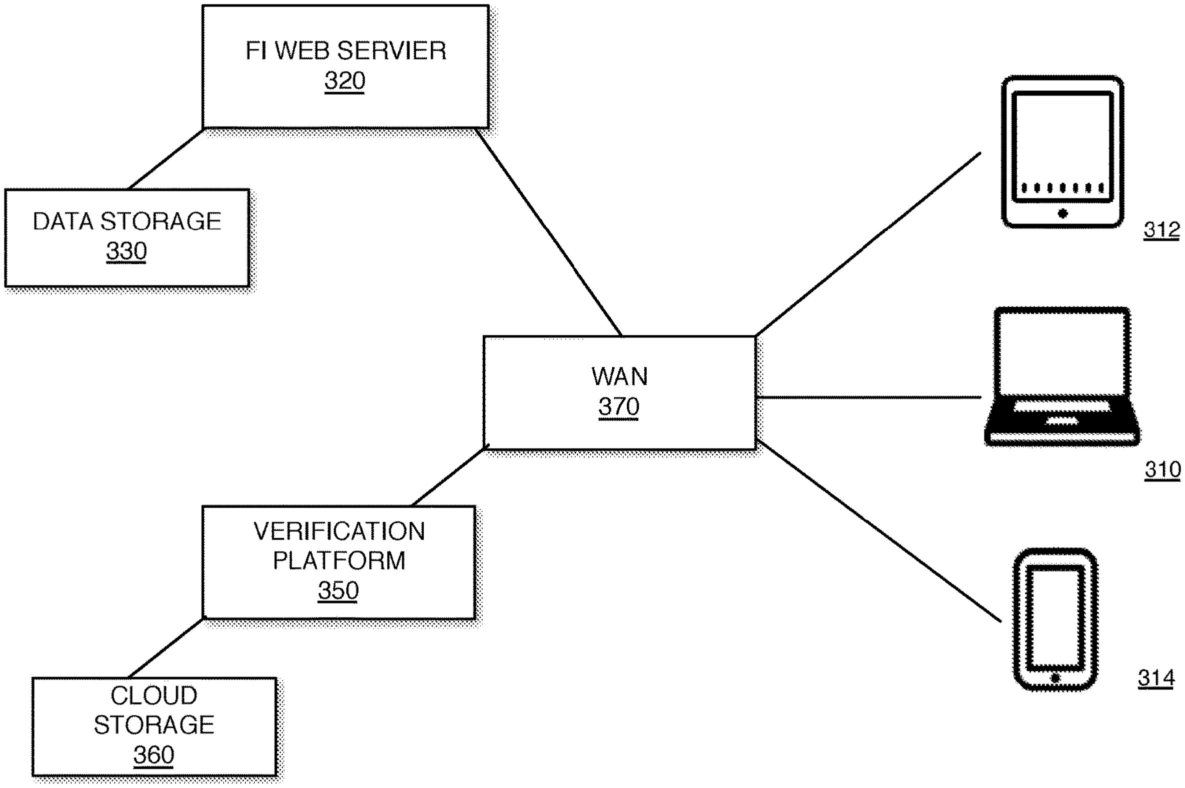
FIG. 3 is a block diagram describing an exemplary system architecture that may be used to implement one or more illustrative aspects described herein.

FIG. 3 describes an exemplary system architecture that may be used to implement one or more illustrative aspects described herein. Computer software, hardware, and networks may be utilized in a variety of different system environments, including standalone, networked, remote-access, virtualized, and/or cloud-based environments, among others.

In embodiments, a user may engage with the system via one or more user computing devices connected to the network. Referring to FIG. 3, exemplary computing devices may include personal computer 310. In embodiments other computing devices may be utilized—alternatively or in concert—including tablet computer 312, mobile device 314, and similar devices.

In embodiments, computing device 310 may be a personal computer, a server, a network router, switch or bridge, virtual assistant (e.g., Amazon Alexa, Google Home, Apple HomePod), digital media player (e.g., Amazon Fire, AppleTV, Roku, Google Chromecast, Roku), smartwatch, a set-top box (STB), gaming system, or any machine capable of executing a set of instructions (sequential or otherwise) that specify actions to be taken by that computing device.

While only a collection of computing devices are illustrated, the term "computing device" should be taken to include any collection of computing devices that individually or jointly execute a set (or multiple sets) of instructions to perform any one or more of the methodologies discussed herein.

In embodiments, the computing device may be connected (e.g., networked) to other machines in a LAN, an intranet, an extranet, a WiFi network, a cellular network, or the Internet (WAN) 470. In embodiments, computing device 310 (and also 312, 314) may be provided with a web browser for facilitating connections over the network.

In embodiments of the present invention, a browser plugin may be provided on computing device 310 to carry out the steps described in FIGS. 2-3. The term "plugin" refers to any software component that extends the functionality of the user's existing system.

In further embodiments, computing device 310 may be provided with an app that implements the methodologies discussed herein. In embodiments of the invention, a software development kit ("SDK") may be provided to facilitate development of mobile apps (or other software) to run operate with the system of the present invention.

In embodiments, the system of the present invention may include one or more web servers 320, each connected to a financial information database or data storage device 330. In embodiments, the computing device may be connected (e.g., networked) to other machines in the same manner as the computing device 310 (and also 312, 314), namely, in a LAN, an intranet, an extranet, a WiFi network, a cellular network, or the Internet.

In embodiments, the system of the present invention may include a verification platform server 350 and associated cloud storage 360. The verification platform server 350 may contain code that implements the synchronization steps shown in FIG. 2 discussed herein. Cloud storage 360 may be a data storage device, which can be configured as a server computing service, for receiving user data during synchronization. Synchronizations server 360 may be function as an intermediary system between a user and financial institution, and coordinate the steps of accessing, storing, and processing user FI data.

As shown in FIG. 3, various nodes including those associated with a network—including 310, 320, 330, 340—may be interconnected using a wide area network (WAN) 370, such as the Internet. Other networks may also or alternatively be used, including private intranets, corporate networks, LANs, metropolitan area networks (MAN) wireless networks, personal networks (PAN), and the like. Network 370 is for illustration purposes and may be replaced with fewer or additional computer networks. A local area network (LAN) may have one or more of any known LAN topology and may use one or more of a variety of different protocols, such as Ethernet. Devices—including 310, 312, 314—may be connected to one or more of the networks via ethernet cable, coaxial cable, fiber optic cable, wireless communication protocols utilizing radio waves (including, e.g., WiFi and Bluetooth), or other communication media.

It will be understood that the term "network" refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

It will be understood by those of ordinary skill in the art that computing devices, server computing devices, and data storage may be combined on the same physical machines, and retain separate virtual or logical addresses, or may reside on separate physical machines. FIG. 3 illustrates just one example of a network architecture that may be used, and those of skill in the art will appreciate that the specific network architecture and data processing devices used may vary, and are secondary to the functionality that they provide, as further described herein. For example, services provided by web server 320 and data server 330 may be combined on a single server.

Each component node on the network may be any type of known computer, server, or data processing device. User computing devices and servers may include a processor controlling overall operation of the computing device or server. These devices may further include random access memory (RAM), read-only memory (ROM), network interface, input/output interfaces (e.g., keyboard, touchscreen, mouse, display, printer, etc.), and memory.

Memory may also store data used in performance of one or more aspects described herein, including the databases associated with the servers discussed herein. Information can be stored in a single database, or separated into different logical, virtual, or physical databases, depending on system design. Those of skill in the art will appreciate that the functionality of user computing devices and servers described herein may be spread across multiple data processing devices, for example, to distribute processing load across multiple computers, to segregate transactions based on geographic location, user access level, quality of service, etc.

One or more aspects may be embodied in computer-usable or readable data and/or computer-executable instructions, such as in one or more program modules, executed by one or more computers or other devices as described herein. Generally, program modules include routines, programs, objects, components, data structures, etc., that perform particular tasks or implement particular abstract data types when executed by a processor in a computer or other device. The modules may be written in a source code programming language that is subsequently compiled for execution, or may be written in a scripting language such as (but not limited to) scripting or markup languages. The computer-executable instructions may be stored on a computer-readable medium such as a nonvolatile storage device. Any suitable computer-readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer-executable instructions and computer-usable data described herein.

Although the foregoing invention has been described in detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A computer-implemented method, comprising:

receiving, by a verification platform computing device and via an application programming interface (API), account information associated with a user account, wherein the API provides a connection via a network between the verification platform computing device and a financial institution computing device;

initiating, by the verification platform computing device, a deposit of an amount to the user account using the account information;

monitoring, by the verification platform computing device, the user account on a periodic basis;

identifying, by the verification platform computing device and based on monitoring the user account on the periodic basis, the deposit as cleared;

verifying, by the verification platform computing device, the user account after monitoring the user account on the periodic basis and after identifying the deposit as cleared based on monitoring the user account on the periodic basis; and transmitting, by the verification platform computing device and via the network, a verification of the user account to a user device, wherein the verification of the user account is transmitted after the user account is verified after identifying the deposit as cleared, and wherein the user device, the verification platform computing device, and the financial institution computing device are different devices.

2. The computer-implemented method of claim 1, wherein a verification process is triggered via at least one of:

a browser plugin, a system service,
a web widget, or
a mobile application.

3. The computer-implemented method of claim 1, wherein monitoring the user account on the periodic basis comprises:
periodically accessing the user account.

4. The computer-implemented method of claim 1, wherein monitoring the user account comprises:
logging into the user account; and
verifying a transaction history.

5. The computer-implemented method of claim 3, wherein monitoring the user account is accomplished via the API.

6. The computer-implemented method of claim 1, further comprising:
receiving login credentials of a user associated with the user account; and
storing the login credentials and the account information.

7. A verification platform computing device, comprising:
one or more memories; and
one or more processors configured to cause the verification platform computing device to:
receive, via an application programming interface (API), account information associated with a user account,
wherein the API provides a connection via a network between the verification platform computing device and a financial institution computing device;
initiate a deposit of an amount to the user account using the account information;
monitor the user account on a periodic basis;
identify, based on monitoring the user account on the periodic basis, the deposit as cleared;
verify, after monitoring the user account on the periodic basis and after identifying the deposit as cleared based on monitoring the user account on the periodic basis, the user account; and
transmit, via the network, a verification of the user account to a user device,
wherein the verification of the user account is transmitted after the user account is verified after identifying the deposit as cleared, and
wherein the user device, the verification platform computing device, and the financial institution computing device are different devices.

8. The verification platform computing device of claim 7, wherein a verification process is configured to be triggered via at least one of:
a browser plugin,
a system service,
a web widget, or
a mobile application.

9. The verification platform computing device of claim 7, wherein the one or more processors, to monitor the user account on the periodic basis, are configured to cause the verification platform computing device to:
periodically access the user account.

10. The verification platform computing device of claim 7, wherein the one or more processors are further configured to cause the verification platform computing device to:
receive login credentials of a user associated with the user account; and
store the login credentials and the account information.

11. A non-transitory computer-readable medium including one or more computer-executable instructions that, when executed by a computing device, cause the computing device to:
receive, via an application programming interface (API), account information associated with a user account,
wherein the API provides a connection via a network between the computing device and a financial institution computing device;
initiate a deposit of an amount to the user account using the account information;
monitor the user account on a periodic basis;
identify, based on monitoring the user account on the periodic basis, the deposit as cleared;
verify, after monitoring the user account on the periodic basis and after identifying the deposit as cleared based on monitoring the user account on the periodic basis, the user account; and
transmit, via the network, a verification of the user account to a user device,
wherein the verification of the user account is transmitted after the user account is verified after identifying the deposit as cleared, and
wherein the user device, the computing device, and the financial institution computing device are different devices.

12. The non-transitory computer-readable medium of claim 11, wherein a verification process is configured to be triggered via at least one of:
a browser plugin,
a system service,
a web widget, or
a mobile application.

13. The non-transitory computer-readable medium of claim 11, wherein the one or more computer-executable instructions, that cause the computing device to monitor the user account on the periodic basis, cause the computing device to:
periodically access the user account.

14. The non-transitory computer-readable medium of claim 11, wherein the one or more computer-executable instructions further cause the computing device to:
receive login credentials of a user associated with the user account; and
store the login credentials and the account information.

15. The computer-implemented method of claim 1, wherein the account information includes an account number and a routing number.

16. The computer-implemented method of claim 1, wherein verifying the user account comprises:
identifying the deposit of the amount, and
verifying the user account based on identifying the deposit of the amount.

17. The verification platform computing device of claim 7, wherein the one or more processors, to monitor the user account, are configured to cause the verification platform computing device to:
log into the user account; and
verify a transaction history.

18. The non-transitory computer-readable medium of claim 11, wherein the one or more computer-executable instructions, that cause the computing device to monitor the user account, cause the computing device to:
log into the user account; and
verify a transaction history.

19. The computer-implemented method of claim 1, further comprising:

detecting a request for initiating a verification process, wherein the account information is received based on receiving the request.

20. The computer-implemented method of claim 1, further comprising:

transmitting the verification of the user account to the financial institution computing device.

* * * * *